(12) United States Patent
Muller et al.

(10) Patent No.: US 8,065,331 B2
(45) Date of Patent: Nov. 22, 2011

(54) PERSONALIZED WEBSITE AND DATABASE FOR A MEDICAL ORGANIZATION

(75) Inventors: Gunter Muller, Hassfurt (DE); Claus Werner, Hirschaid (DE)

(73) Assignee: Siemens Aktiengesellschaft (DE)

( * ) Notice: Subject to any disclaimer, the term of this patent is extended or adjusted under 35 U.S.C. 154(b) by 568 days.

(21) Appl. No.: 12/133,893

(22) Filed: Jun. 5, 2008

(65) Prior Publication Data
US 2009/0307223 A1  Dec. 10, 2009

(51) Int. Cl.
*G06F 7/00* (2006.01)
*G06F 17/30* (2006.01)

(52) U.S. Cl. .................................. 707/784; 707/944
(58) Field of Classification Search .................. None
See application file for complete search history.

(56) References Cited

U.S. PATENT DOCUMENTS

| | | | |
|---|---|---|---|
| 5,949,419 A * | 9/1999 | Domine et al. | 715/744 |
| 2003/0236945 A1* | 12/2003 | Nahum | 711/114 |
| 2007/0016514 A1* | 1/2007 | Al-Abdulqader et al. | 705/37 |

OTHER PUBLICATIONS

Axinom establishes „My Intranet for Siemens Healthcare AX (1 page).

* cited by examiner

*Primary Examiner* — Uyen T. Le
(74) *Attorney, Agent, or Firm* — Lempia Summerfield Katz LLC

(57) ABSTRACT

A system and method for managing the access of individuals to an information infrastructure is described. The metaphor for the user interface may be "myIntranet", suggesting that the functions are similar to that of a browser of a client connected to the world-wide-web (WWW) through the Internet. The home page of "myIntranet" may be customized at a plurality of organizational levels within a medical facility, so as to provide rapid access to information that a person needs to perform a particular job responsibility. Each person may have a unique home page, or the home page may be customized, in part, by the user. Other portions of the home page may be customized by the department, the information technology organization, or other user with the appropriate permission. The configuration of the home page is associated with the individual user through a log-on procedure.

12 Claims, 7 Drawing Sheets

| Area | Admin | Department | User |
|---|---|---|---|
| General | W | | |
| Department | W | W | |
| Process | | W | M |
| Personal | | | W, M |

FIG. 5

PERSONALIZED WEBSITE AND DATABASE FOR A MEDICAL ORGANIZATION

TECHNICAL FIELD

The present application may relate to a system and method for customizing the user interface of a workstation in a medical service organization.

BACKGROUND

Medical facilities, such as hospitals and clinics, have departments with highly differentiated functions within the overall organization. Each of the departments may have personnel of varying skill levels, scope of authority, job function and the like. Each of the employees may be expected to be aware of both generalized aspects of the organization function and operation, as well as specific aspects related to the assigned job function. Moreover, the job functions may range from simple administrative tasks, to highly specialized medical procedures.

A computer-based information system interface may exist. Interfaces to such systems have fixed formats where the display may be visually organized similarly to a computer desktop or webpage display, and are not customized individual job function. Apart from access limitations based on a password and a permissions table, the configuration of the user interface may not be optimized to the particular user, or the level of training of such individuals.

SUMMARY

A method of configuring a user interface to an information infrastructure is described, the method including the steps of: providing a user server including a data display unit; accepting data input to the user server, the data identifying a user and including a user specific identification; communicating with an administrative data base, the data base having a record associated with the user and including a configuration table for a home page and a permission level; retrieving information to display the home page from one or more data bases using the configuration table and the permission level; and, displaying the home page, the home page having a plurality of links to data storage locations.

In an aspect, a method of managing access to an information system includes the steps of: providing a user server including a data display unit; accepting data input to the user server, the data identifying a user and including a user specific identification; determining whether the user has permission to modify an existing configuration of a home page of another user. Where such permission to modify is found, selecting a link from a data base of permitted links and configuring the another user home page to display selected link in an area for which the user has permission; and storing the modified configuration in a data base of the information system in place of the existing configuration.

In another aspect, a method of accessing an information system includes: providing a user server including a data display unit; accepting data input to the user server, the data identifying a user and including a user specific identification; communicating with an administrative data base of the information system, the data base having a record associated with the user and including an existing configuration table for a home page and a permission level; viewing a home page configured to display multiple data areas having links, at least one data area having links configured by another user; selecting a data area for which the user has a permission to modify the configuration; selecting a link from a data base of permitted links and configuring the user home page to display the selected link; and storing the modified configuration table in a data base of the information system in place of the existing configuration table.

BRIEF DESCRIPTION OF THE DRAWINGS

FIG. 5 is an example of a table of permissions for the configuration of the user home page;

DETAILED DESCRIPTION

Figure 1:
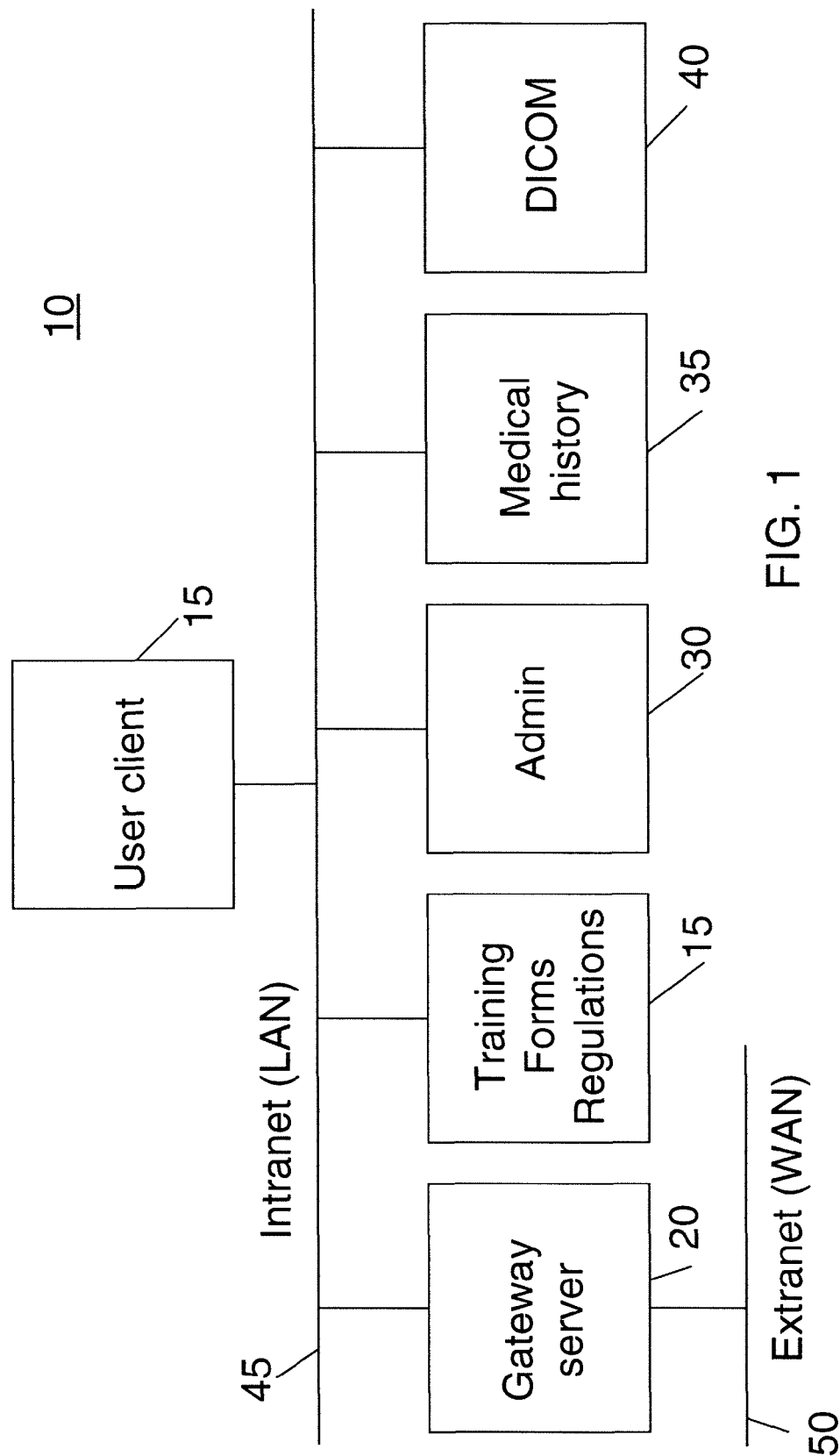
FIG. 1 is a block diagram of an information infrastructure that may be found in a hospital.

Exemplary embodiments may be better understood with reference to the drawings. In the interest of clarity, not all the routine features of the implementations described herein are described. It will of course be appreciated that in the development of any such actual implementation, numerous implementation-specific decisions must be made to achieve a developer's specific goals, such as compliance with system and business related constraints, medical potocols and regulatory requirements, and that these constraints will vary from one implementation to another.

The combination of hardware and software to accomplish the tasks described herein may be termed a platform, or an information system. The instructions for implementing processes of the platform may be provided on computer-readable storage media or memories, such as a cache, buffer, RAM, removable media, hard drive or other computer readable storage media. Computer readable storage media include various types of volatile and nonvolatile storage media. The functions, acts or tasks illustrated or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Some aspects of the functions, acts, or tasks may be performed by dedicated hardware, or manually by an operator.

In an embodiment, the instructions may be stored on a removable media device for reading by local or remote systems. In other embodiments, the instructions may be stored in a remote location for transfer through a computer network, a local or wide area network, by wireless techniques, or over telephone lines. In yet other embodiments, the instructions are stored within a given computer, system, or device.

Where the term "data network", "web" or "Internet", or the like, is used, the intent is to describe an internetworking environment, including both local and wide area telecommunications networks, where defined transmission protocols are used to facilitate communications between diverse, possibly geographically dispersed, entities. An example of such an environment is the world-wide-web (WWW) and the use of the TCP/IP data packet protocol, and the use of Ethernet or other known or later developed hardware and software protocols for some of the data paths. Often, the internetworking environment is provided, in whole or in part, as an attribute of the facility in which the platform is located.

Communications between the devices, systems and applications may be by the use of either wired or wireless connections. Wireless communication may include, audio, radio, lightwave or other technique not requiring a physical connection between a transmitting device and a corresponding receiving device. While the communication may be described as being from a transmitter to a receiver, this does not exclude the reverse path, and a wireless communications device may include both transmitting and receiving functions. Such wireless communication may be performed by electronic devices capable of modulating data as signals on carrier waves for transmission, and receiving and demodulating such signals to recover the data. The devices may be compatible with an industry standard protocol such as IEEE 802.11b/g, or other protocols that exist, or may be developed.

FIG. 1 shows a simplified block diagram of the information infrastructure 10 of a medical care facility, such as a hospital. Each person who may be authorized to access some or all of the information stored within the information infrastructure 10 may be able to use a user client 15, which may be any one of a number of data terminals capable of accessing the intranet 45, which may be, for example an Ethernet configuration, of which as simplified schematic representation is shown. Such a intranet 45, which may have a variety of servers, routers, bridges and other facilities (not shown) needed to integrate a large data base of diverse information with a user community, may provide access to a variety of data bases, on-line analytic software tools such as data mining tools, external interfaces, and the like.

As examples, a gateway server 20 may permit specific authorized users to communicate with external services over the Internet. This may include verifying insurance coverage, updating software modules or the like. Such a gateway server may also allow selected access to an extranet 50, which may be the Internet for external email service, or to selectively obtain information from a server on the Internet so as to provide local news and weather information to users. Similarly, access may be provided to search engines or other Internet functions on the World Wide Web (WWW). As interfaces between internal databases and other software functions are susceptible to intrusive damage or integrity compromise by software programs of various types (e.g., viruses, worms, malware, or the like) on the Internet, access to the Internet 50 by the gateway server 20 may be controlled and monitored by a "firewall". In addition, access to specific universal resource locators (URL) identifying specific servers or users on the Internet may be permitted or denied in accordance with a policy, which may be relate to the access privileges of the user, or to all users.

When a user logs on to a user client 15, the user client 15 may communicate with a server, which may be an administrative server and data base 30, which verifies the identity of the user and determines the job function, training status, and access privileges uniquely identified with the user. Other administrative data relating to the user may be stored in the same or an associated data base, including attendance and payroll records, health insurance status and the like, which may be maintained by a human resources department.

In order to perform a job function, the user may need to be trained. Training may be done prior to actually performing a job function, so as to reach a basic level of skill to perform a job function. However, additional training may need to be provided so as to either maintain or upgrade skills. In accordance with many industrial quality management systems, training and qualification of personnel to perform specific job functions is required in order to comply with the quality system protocols. The training materials may be arranged for self study, may be interactive, and may include testing modules. Such training may be performed by the user accessing a next training module in a sequence of training modules and completing a curriculum. The training materials may be stored in a separate data base 25, which may also include appropriate forms for administrative purposes, and summaries and full texts of regulations, work procedures and quality procedures. Access to the training materials may be limited to users with a specific job function, or of a particularly department, or may be particularized to an individual user. Locating such material in a listing of training materials and keeping track of the individual progress, would be difficult without some organizing principle.

Rules, forms, and procedures change in any practical organizational situation. This may occur due to changes in government regulation, the terms of contractual relationships with other organizations, restructuring of the internal organization, correction of errors, improvements in work flow, and the like. Such change may result in new versions of forms, new procedures, or the like. Making an individual aware of such changes is a difficult task, as the particular form or procedure may not be used often. Moreover, retraining of the user to use the new form or procedure may need to be documented for legal or quality system reasons.

Individuals involved, for example, in the care of patients may need to access medical history data, for the purposes of adding information, such as laboratory test results, for the purpose of reviewing the medical history and adding new information, or for reviewing the medical history for the purposes of making a medical diagnosis. Such data may be stored in a medical history data base 35, and may incorporate information such as may be collected using an interface to imaging and other diagnostic equipment such as the standardized Digital Communications in Medicine (DICOM) 40. One may easily appreciate that the types of forms, procedures and the nature of the access to a personal medical history data base may be quite different for the admissions clerk and for the attending physician. As such, the level of access, the types of data that may be displayed, and whether read-only or read-write access is provided may vary. Easily finding the correct subset of the data, forms and training materials or other software tools in the information infrastructure may improve the efficiency of operations, and ensure compliance with organizational, quality, and regulatory standards.

Figure 2:
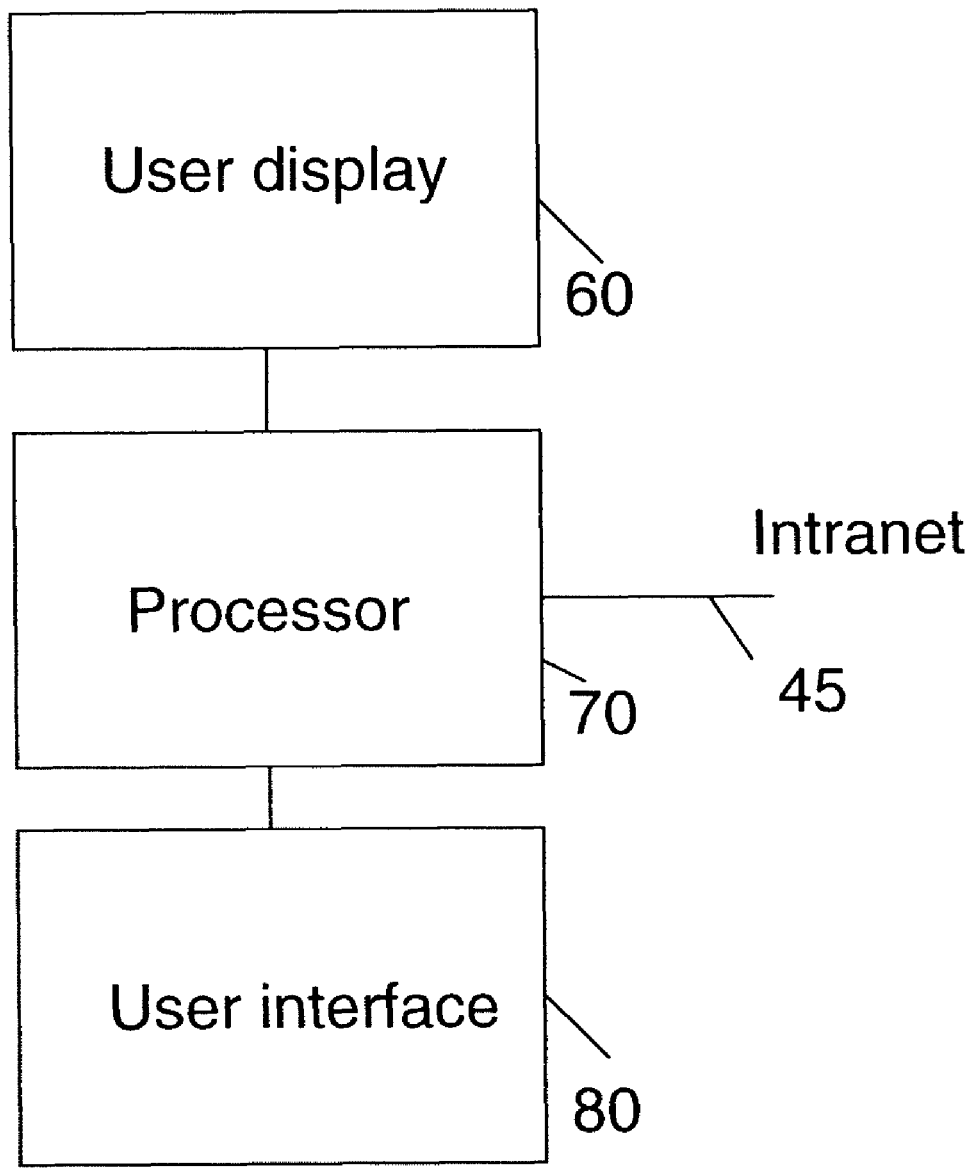
FIG. 2 is a block diagram of a user client.

FIG. 2 is an example of a user client 15. This may be a conventional desktop computer 70, having a user display 60, and a user input device 80 which may be a keyboard or a mouse. The user client is connected to the intranet 45. The connection to the intranet 45 may be through a wired or a wireless connection. The wireless connection may use a standard protocol such as IEEE 802.11b/g, or other protocols that are known or may be later developed.

When a user completes a log on process, the user may be provided with a customized first page display on the user display 60. The esthetic aspects of the display, sometimes called the "skin", is a matter of design choice, and may conform to institutional preferences. As such, the details of the appearance of the skin are not further described in detail herein, as the function aspects disclosed herein are may be understood using simplified representations.

The first page displayed to a user may be typical of the portal or home page of an internet service provider (ISP) but, in this example, the visual content may represent the public information available about the organization. At least one selectable area of the page may be labeled "myIntranet" or the like to suggest to the user that this is a personal workspace, and selecting this link may provide access to another displayed data page. As is known, such pages may be configured using a variety of software programming tools such as HTML (hypertext markup language), Java, or the like. Such tools are being continually evolved, and it is not intended that the identification of specific programming tools as examples be construed as a limitation.

As selection of the "myIntranet" link may provide access to information having confidentiality restrictions, a specific further log-on process may be imposed.

The log-on process serves to identify the user to the information infrastructure 10 and to verify the user by use of at least a password. As the security level of a system is increased, other information such as biometric data including at least one of a fingerprint, a retinal scan, or similar uniquely identifying information mat be used to control access to the information system. Once the individual user is identified and verified, the job function, training status and access permissions associated with the user may be retrieved from the administrative data base. This data set may be stored as a record or configuration table and may form the basis for customizing an individual display page, which may be termed the "home" page of "myIntranet".

Figure 3:
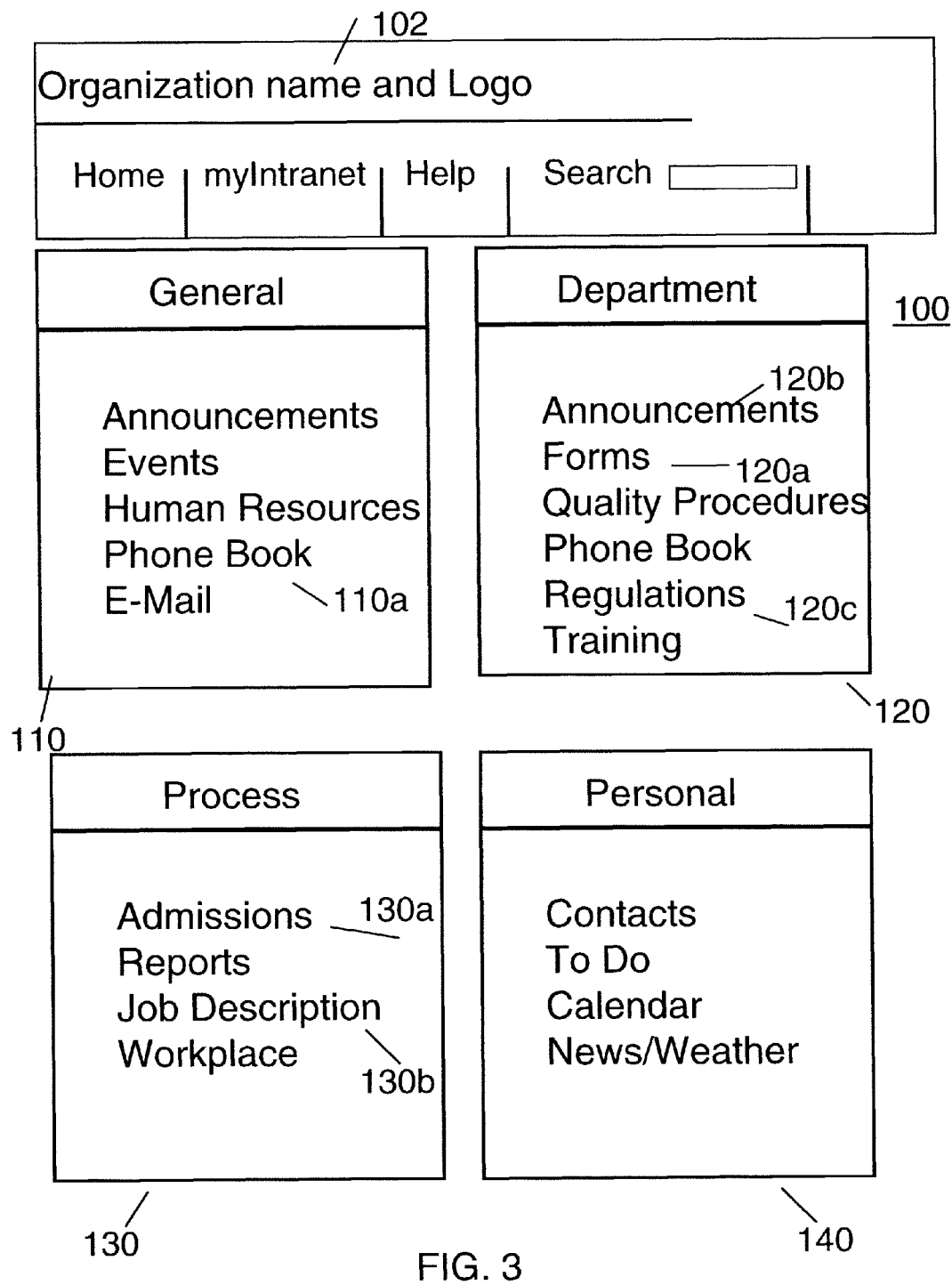
FIG. 3 is a representation of a home page display for an individual user.
Figure 4:
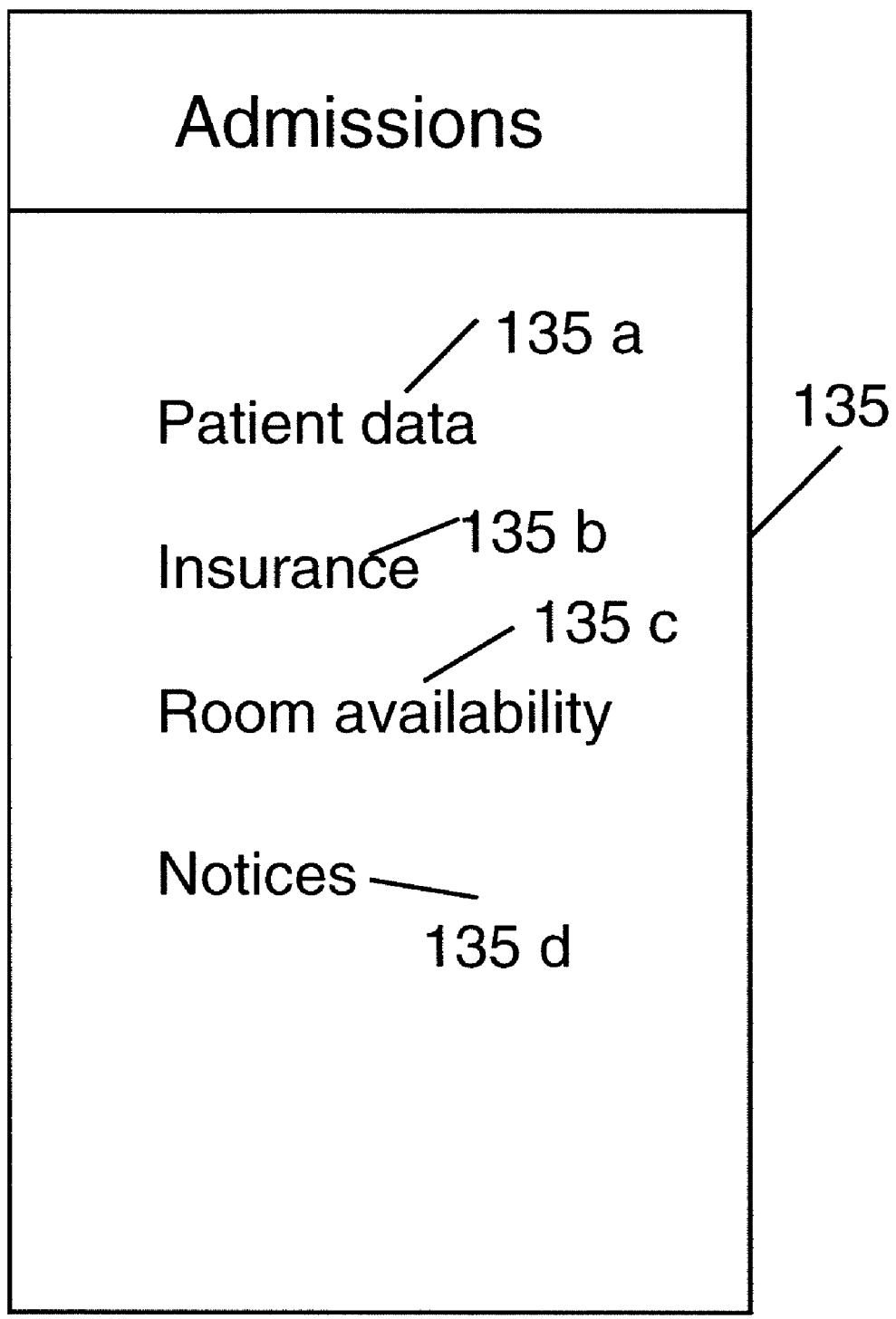
FIG. 4 is a representation of a page selectable from the home page.

In an aspect, as shown in FIG. 3, the home page 100 may contain functional selectable areas as is known in pages in a web browser for the worldwide web, such as "home", "help", "search" and the like. A header 102 which may have display information identifying the organization, and having a slogan or other general information may also be present as part of the skin. A plurality of sub-screens may be present or selectable using a selectable area. They may include a "general" area 110, a "department" area 120, a "process" area 130, and a "personal" area 140. Other areas may also be present. The configuration of each area may be controlled by a different person than the user, although at least the "personal" area 140 may be configurable by the user. The use of this terminology to describe the areas is merely to suggest a functional use of the areas, some of which may be interchangeable or overlapping, and not to exclusively name the areas, or to limit the functions associated with an area.

For example, the general area 110 may be controlled by the information technology department, responsive to requests from functional departments of the hospital, so as to provide general information of use to all personnel. This may include announcements of interest to everyone, announcements that are being made to the public, hospital wide events and the like. The number and type of announcements may be limited so as to avoid information overload and distractions. In addition, general information, such as may be posted by the human resources department, including holidays, health insurance information, and general hospital work policies may be accessed through a selectable linkage (for example, a hyperlink to a document stored in HTML so as to be displayable as similar to a web page on a browser). Where an email account is provided, access may also be provided here. The number and types of links on the general area 110 may be limited so as to avoid clutter, and conform to organizational needs.

More particular to the individual user would be a departmental (functional) area 120 which may focus the individual on information that is somewhat more specific to the job function than is found on the general area 110. The selectable links (e.g., 120a, 120b) may vary from department-to-department, but may include announcements directly relevant to the department, quality and workflow procedures, relevant regulations and interpretations thereof and training materials. A local phonebook 120a may be provided so as to minimize searching through a large on-line telephone directory. This may be a subset of the telephone directory 110a that was accessed through the general area 110. When the department area 120 is selected, it may be viewed as a page occupying the whole screen, if desired, or as one of multiple screens as in FIG. 3.

Access to departmental documents may be restricted by job function, based on the configuration information retrieved at log-on from the administrative data base 30. Access to such information may be desirable so that the individual may view a quality procedure or a training module that has previously been used, when a question arises, or the user desires confirmation of a specific fact or procedure. The documents retrieved by a link may reside in one or more local data bases of the information system or may be external to the information system and accessed, for example, using the Internet.

When a person is performing the allocated job function, the information in the process area 130 may be the most relevant. For purposes of example, the job function of admitting a patient to the hospital is considered here. While this may be a low skill position as compared with a physician or technician, there are specific functions to be performed, and they must be performed correctly. The level of access to medical records needs to be controlled to meet legal requirements for personal privacy, while ensuring the correct identification of the patient and updating of information that should be collected during admission to the hospital. Here, the user may have access to a fillable form. Where the patient has previously been admitted to the hospital, or the top level information is available from a regional or national data base, such information may be retrieve by a form-driven data-base query using a subset of the patient information, which may include at least one of a national identification number (social security number in the United States), name and best address, biometric information, swiping of a machine readable insurance card, or the like.

The form may also have a selectable link to a quality or workflow procedure, or to relevant training materials. In this way, the user is not compelled to search through a general listing of such records and documents in order to locate the specific document. Further, when such access is through a series of links, which may be tiered, the access may be to the source material, so that any update to such material is immediately available to the user. The process area 130 may have links to forms for patient data, room availability, insurance information and permissions which may be needed prior to admission. The room availability may be needed so as to determine whether the hospital has space for the patient, and this availability may be based on the medical specialty. Moreover, the room availability may depend on the department performing the admission. The Emergency room may have a priority on admitting patients with respect to routine admissions.

During the admissions process, medical insurance coverage may be verified, and it may be necessary to notify the insurance provider of the admission. Such functions can be performed using the external access capabilities of the information infrastructure 10 through the gateway server 20. Other formalities may need to be completed as part of the admissions workflow, such as obtaining signed permissions for medical procedures, entering living will, other instructions such as durable powers of attorney and the like. Such documents are typically in paper form at present, and may need to be scanned into the medical record.

In this example, when the admissions link 130a, an associated process page 135 may be displayed as a pop-up menu or as a full screen or similar display area. This process page may have links to specific documents need to be accessed, forms to be completed, and information that may be distributed to the patient. Here, for example, the patient data form 135a may be the relevant top-level document in the patient medical history, stored on the medical history server 35 of the information system 10. Insurance information 135b may be retrievable using a link in the medical data form, or the information may be available through a separate link 135b. When a patient is admitted to a hospital there are often permission forms 135c to be filled out, and there may be notices 135d and other information that must be given to, and acknowledged by, the patient. It is convenient for the related documents to be found in a particular work area of the display.

Where links are shown in a display area by a name, which may be selected by, for example pointing and clicking using a mouse, other selection mechanisms may also be used such as drop down boxes having lists of documents or links, radio buttons or the like.

The process of obtaining signatures on a plurality of forms is time consuming, and creates a paper record that must either be preserved or be scanned into a optical data base. Similarly to the signature pads found in some credit card transaction systems, the patient may be requested to acknowledge receipt of the documents by an electronic-type signature.

When a quality instruction, workflow procedure of training document has been changed, the associated form may be flagged for the user so that the user is alerted to the change when the form is first accessed after the change. This will permit the user to become aware of the change, and when the user views the new information, the training status of the individual may be updated.

A job description 130b may be accessible from this area as well. The job description may, in addition to a functional overview, remind the user of the documents that are authorized for access, and the current training status, and other personal information such as number of sick days remaining.

The complexity of many job functions may necessitate refresher training of the user. Such training, apart from being desirable, may be mandated by organizational policy or regulation. Most quality systems require periodic update or refresher training. Some of the training may be done in a classroom setting, but often the training is more efficiently performed on-line in an interactive training and testing module. As such, the training modules for which the user is currently eligible may be displayed. The user may select a module and perform the training activities. When the module has been successfully completed, the completion may be recorded in the administrative data base 30, and the module access may be deleted from the current training queue. The module is still available to the user through the department area.

In another aspect, training may be provided as part of a career path where the user is pursuing a position for which other training is required, and at least a portion of the training can be performed on line. Here, the training may be voluntary, and self paced. As each training module is completed, the result of the testing or other assessment may be recorded in the administrative data base 30, and the next training module presented in the process area 130. Since an individual may be permitted to log on from a different user server, the user may perform such upgrade training in a training room or at another work station that is not presently being used. The specific course of training will have been selected by the department administration or human resources and be a part of the user's administrative information.

The contents and access permissions process area may generally be controlled at the department level of an organization; however, the detailed information displayed by the area may be selected and may be modified by the individual.

The personal area may be fully customizable by the user. Initially, a default set of links may be provided, which may include a contact list, a to-do list, a calendar, and a link to an external source of news and weather. The contacts may be internal contacts from the phone book, external contacts, and the like. This may also serve to facilitate cross departmental links, where specific contacts in other departments are entered in the list so as to expedite communications. Whether access to an external site is permitted for the news/weather link may be dependent on organizational preference, and this may either not be permitted, or filtered so that a specific subset of a news feed is accessible by the user. The level of access may be adjusted by job function as well as access to search engines and external data bases. For example, in a department performing medical research, on-line access to medical journal and other similar information may be permitted as part of data base searching. The personal area may be organized as selectable links, or in another fashion, such as a desktop view metaphor, as is common in current desktop computer operating systems.

In job functions where data processing tools such as spread sheets, data mining tools and the like may be used, a variety of reports may be designed computed and published for personal use, or placed in shared areas where they may be accessed by other users with the appropriate authorization.

As such, the content and access permissions for the various areas of the user display are controlled by different organizational functions. FIG. 5, for example, is a simplified table of authorizations for the areas described above. Organizational levels having the authority to determine the content of an area are shown as having "write" (W) permission. Typically a user at some level of the organization may have permission to perform some modifications of the information that is available in a particular screen area. This may be termed "modify" (M) permission, and may include the filling of forms, data mining and the preparation of reports and the like. All users have read permission for the links that are displayed on their specific user displays. Thus, links that are not permitted are not displayed, and the user is focused on the links related to the user's job description and training.

Figure 6:
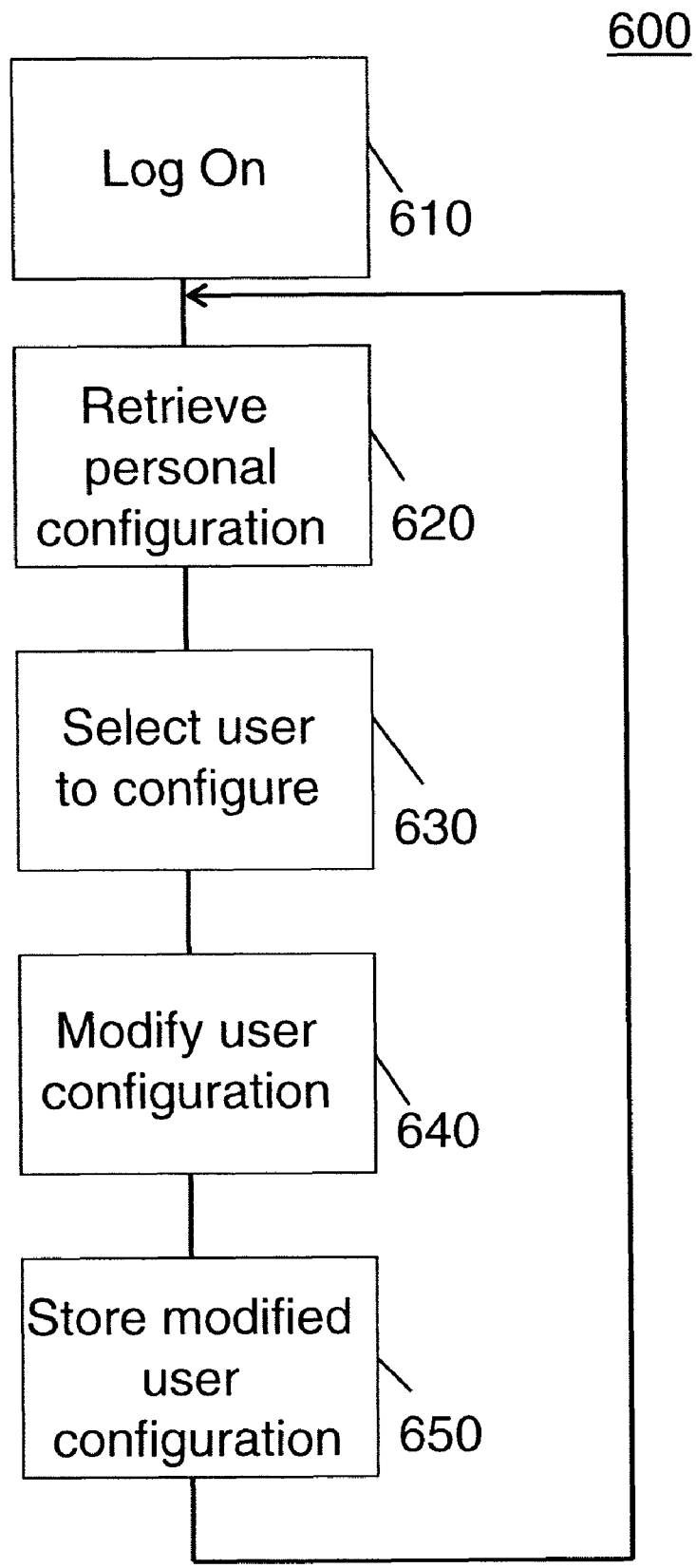
FIG. 6 is a flow chart for the actions taken by a user having permission to modify the configuration of the home page of another user.

In an example, FIG. 6 shows a simplified flow chart of the steps that a person authorized to modify the configuration of another user would perform to change the configuration of a home page of "myIntranet." Such an authorized person may be in a specific department, or have a specific job function. The method 600 includes the steps of logging on (step 610), where the personal information of the individual, which may include a password is verified. A configuration table associated with the individual that has logged on may be retrieved from an administrative data base, the table having information as to the level of access to the information infrastructure that is permitted (step 620). For example, the individual may be authorized to modify the department area of the myIntranet page, but not the general area. A list of individual users for which this modification may be performed may also be retrieved, and a specific user selected for configuration (step 630). A plurality of individual users may be selected as a group, for example by job description, or other functional description. The person performing the re-configuration of the myIntranet page may select or deselect links to information infrastructure data or functions (step 640), and by this action enable or disable the access to such functions and data by the individual user. Once the re-configuration has been completed, the individual user configuration table may be stored in place of the previous version of the table (step 650).

Figure 7:
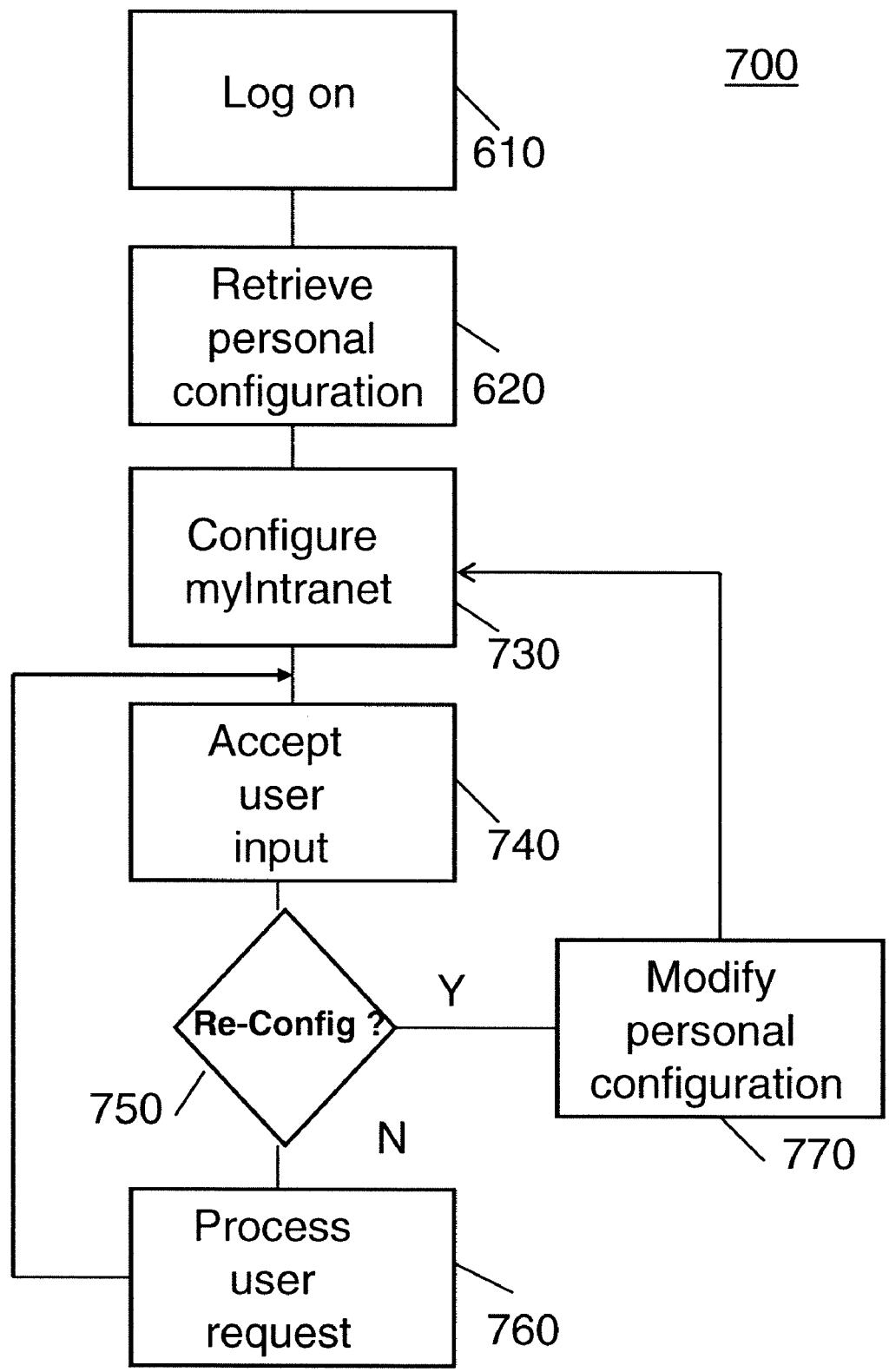
FIG. 7 is a flow chart for the actions taken by a user to interact with the information infrastructure using a personal home page on "myIntranet".

In another aspect of the method (700), an individual user may also access the information infrastructure as shown in FIG. 7. The logging on process (step 610) and retrieval of the personal configuration (step 620) may be the same or similar to that performed in the method of FIG. 6. The retrieved personal configuration may be used to configure the myIntranet portal for the user. However, changes to personal configuration of the individual user are limited by the permissions of the individual configuration table. An individual user may be restricted so that only an individual area or, alternatively, no aspect of the personal myIntranet page, may be re-configured. In the case of an individual performing a specific job function, a personal area may be allocated so that the individual may select from a group of tools such as a contact list, personal calendar, calculator, or similar functions to be accessible through links on the myIntranet page. The selection of such tools may be a matter of personal preference. When the user interacts with the information infrastructure through the user client, the request is analyzed to determine if the request in is to modify the personal area of the myIntranet page (step 750Y). Where a modification of the configuration is made (step 770), such modification is stored in place of the previous individual configuration table (770), and the myIntranet page is also modified by repeating step 730 with the new configuration. Where the request is for the execution of a function using an existing link (step 750N), the interaction may proceed using the presently available links to perform the appropriate job function. This may include retrieving and completing forms, performing interactive training, analyzing data in a data base using data base queries, or accessing links associated with the personal area (step 760). Such access uses the displayed links and pre-established access protocols. Once the response is displayed for the user the process may continue as needed.

By distributing the authority to manage each of the areas of the user display amongst different levels of the organization, the presentation and control of information may be managed in a distributed and flexible fashion. Each of the organizations of persons authorized to make changes to an area may operate within the bounds of the permissions without affecting needing to coordinate with the other areas. Some of the links provided may be accessed from different areas. For example, a workflow for filling out a form may be accessed by the user from the form itself, or from a department area where the workflows for the department and job description are accessible. As such, the user may find one of the methods of access more convenient at a particular time. For example, the user may browse training modules on the department area and select an available training module. Once selected, the module may appear on the process area until completed.

While the methods disclosed herein have been described and shown with reference to particular steps performed in a particular order, it will be understood that these steps may be combined, sub-divided, or reordered to from an equivalent workflow method without departing from the teachings of the present invention. Accordingly, unless specifically indicated herein, the order and grouping of steps is not a limitation of the present invention. Further, it should be understood that the names of the data bases, and the assignment of data bases to particular servers in the description herein, is for convenience in description only, and the data may be dispersed of consolidated in different data structures or physical locations without changing the concept.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as set forth in the following claims.

What is claimed is:

1. A method of configuring a user interface, the method comprising:
   providing a user server including a data display unit;
   accepting data input to the user server, the data identifying a first user and including a user-specific identification;
   communicating with an administrative data base, the administrative data base having a record associated with the first user and including a configuration table for a home page and a permission level;
   retrieving information to display the home page from one or more data bases using the configuration table and the permission level; and
   displaying the home page, the home page having a plurality of links to data storage locations,
   wherein the home page has a plurality of configurable display areas, at least one display area of the plurality of configurable display areas being configurable by a second user having a different organizational function from the first user.

2. The method of claim 1, further comprising:
   accepting additional data input to the user server, the additional data entered by the first user so as to select a link of the plurality of links, the link being to one of the data storage locations;
   retrieving data associated with the one data storage location and displaying the data on the retrieved data display unit.

3. The method of claim 2, wherein the displayed data is a fillable form.

4. The method of claim 3, wherein the fillable form has a link to another of the data storage locations, the other data storage location having a quality procedure or workflow associated with the fillable form.

5. The method of claim 3, further comprising:
   entering data using the fillable form.

6. The method of claim 1, wherein the different organizational functions include at least two of an individual having a job description, a functional or administrative department of the individual, and an information infrastructure department.

7. The method of claim 6, wherein more than one but less than all of the plurality of configurable display areas are configurable by one of the different organizational functions.

8. The method of claim 6, wherein the first user is enabled to access the plurality of links of the data display unit and to modify records accessed through the plurality of links in accordance with the permission level.

9. The method of claim 1, wherein at least one of the plurality of links enables access to a training module, and
   wherein the at least one link is configurable by the second user.

10. The method of claim 9, wherein the permission level depends in part on completion of the training module.

11. A method of managing access to an information system, the method comprising:
    providing a user server including a data display unit;

accepting data input to the user server, the data identifying a user and including a user-specific identification; and determining whether the user has permission to modify an existing configuration of a page of another user, wherein the permission to modify is found modifying the existing configuration of the another user page for which the user has permission, and storing the modified configuration in a data base in place of the existing configuration.

12. A method of accessing an information system, the method including:

providing a server including a data display unit;

accepting data input to the server, the data identifying a user and including a user specific identification;

communicating with an administrative data base, the administrative data base having a record associated with another user and including an existing configuration table for a home page of the other user;

viewing the home page of the other user, the home page of the other user being configured by the existing configuration table to display data areas having links;

selecting a data area of the home page of the other user, for which the user has a permission to modify the configuration table;

selecting a link from a data base of permitted links and configuring the home page of the other user to display the selected link, including modifying the existing configuration table; and storing the modified configuration table in the data base in place of the existing configuration table.

* * * * *